United States Patent [19]

Tanimoto

[11] Patent Number: 5,038,182
[45] Date of Patent: Aug. 6, 1991

[54] COPIER OPERABLE IN A TWO-SIDED COPY MODE

[75] Inventor: Kumiko Tanimoto, Tokyo, Japan

[73] Assignee: Ricoh Company, Ltd., Japan

[21] Appl. No.: 640,226

[22] Filed: Jan. 11, 1991

[30] Foreign Application Priority Data

Jan. 19, 1990 [JP] Japan ................................. 2-10240

[51] Int. Cl.$^5$ ............................................. G03G 21/00
[52] U.S. Cl. .................................. 355/320; 355/204;
355/308; 355/318
[58] Field of Search ............... 355/204, 308, 313, 318,
355/319, 320; 271/153, 265

[56] References Cited

U.S. PATENT DOCUMENTS

| | | |
|---|---|---|
| 4,330,197 | 5/1982 | Smith et al. |
| 4,881,729 | 11/1989 | Culligan et al. ................ 355/318 X |
| 4,928,151 | 5/1990 | Saeki ................................. 355/320 |
| 4,935,780 | 6/1990 | Yamada et al. ................ 355/313 X |
| 4,974,035 | 11/1990 | Rabb et al. .......................... 355/320 |

Primary Examiner—R. L. Moses
Assistant Examiner—Sandra L. Hoffman
Attorney, Agent, or Firm—Mason, Fenwick & Lawrence

[57] ABSTRACT

A copier having an automatic document feeder (ADF) and selectively operable in a one-side copy mode for reproducing a document image on only one side of a paper sheet and a two-sided copy mode for reproducing document images on both sides of a paper sheet. A reversing device reverses a paper sheet undergone a copying procedure. When a tray included in the ADF is loaded with a combined stack of one-sided and two-sided documents, the condition of the back of each document is sensed by a sensor while the document is transported toward an illuminating position. The copier is automatically conditioned for the two-sided copy mode if an image is present on the back of the document or for the one-sided copy mode if otherwise. The paper sheets with images are reversed only in one of the two different copy modes before driven out of the copier.

3 Claims, 8 Drawing Sheets

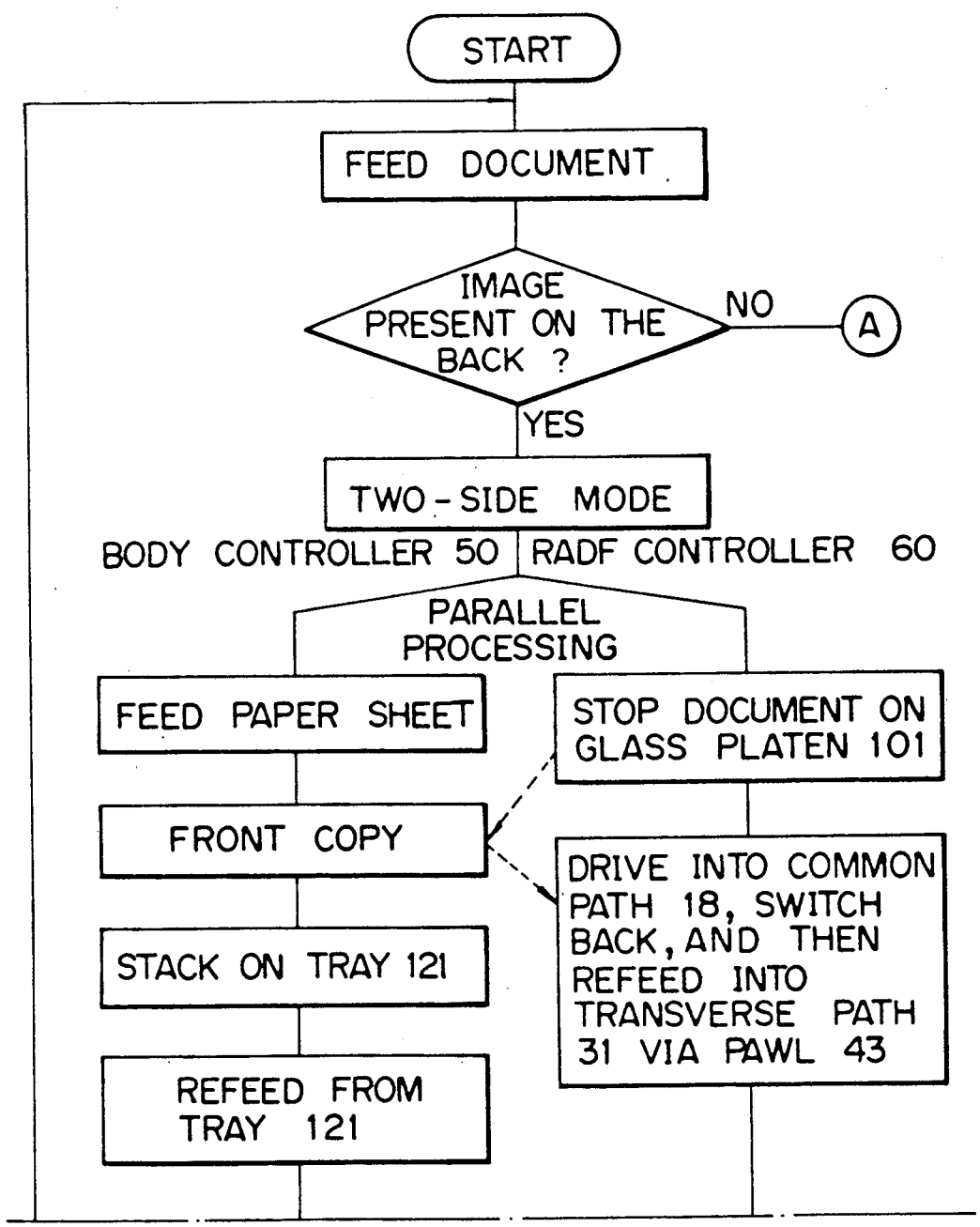

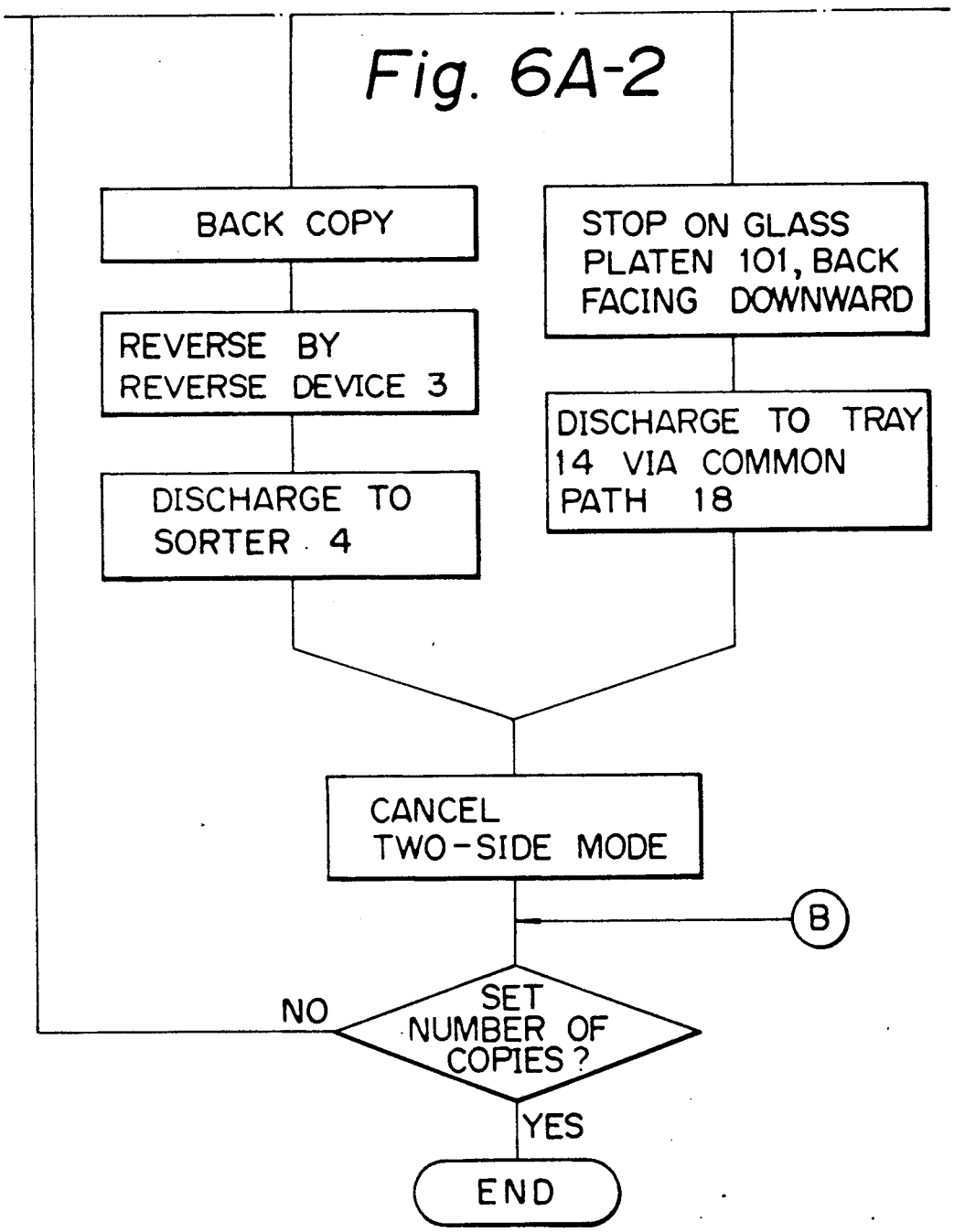

COPIER OPERABLE IN A TWO-SIDED COPY MODE

BACKGROUND OF THE INVENTION

The present invention relates to a copier having an automatic document feeder (ADF) and operable in a two-sided copy mode.

A copier with an ADF is often constructed to be selectively operable in a one-sided copy mode for reproducing a document image on only one side of a paper sheet and a two-sided copy mode for reproducing document images on both sides of a paper sheet. This type of copier usually incorporates a reversing device for reversing a paper sheet undergone a copying procedure. Assume that such a copier is used to reproduce a combined stack of one-sided and two-sided documents on paper sheets. Then, it is a common practice to divide the documents into one-sided documents and two-sided documents beforehand, reproduce the one-sided documents in a one-sided copy mode and the two-sided documents in a two-sided copy mode independently, and then rearrange the documents in order of page. Such an operation is time- and labor-consuming. Especially, when the desired documents are not numbered, it is necessary for the operator to memorize the order of all the documents as to page beforehand. When a great number of documents are to be reproduced, a substantial period of time has to be consumed in sorting the documents into one-sided and two-sided documents. Should all such documents be continuously copied in the two-sided mode in order to save time and labor, the copying operation would be effected even with the blank sides of one-sided documents to increase the copying time.

SUMMARY OF THE INVENTION

It is therefore an object of the present invention to provide a copier operable in a two-sided copy mode and automatically effecting, when a combined stack of one-sided and two-sided documents is used, a two-side copy mode with two-sided documents and a one-side copy mode with one-sided documents and, yet, discharging copies in order of page.

In accordance with the present invention, in a copier of the type having an ADF and selectively operable in a one-side copy mode for reproducing a document image on only one side of a paper sheet and a two-sided copy mode for reproducing document images on both sides of a paper sheet, and incorporating a reversing device for reversing a paper sheet undergone a copying procedure, a sensor determines whether or not a document being transported by the ADF toward an illuminating position carries an image on the back thereof. A controller automatically controls the copier for the two-sided copy mode in response to an output of the sensor indicative of presence of an image on the back of the document or for the one-sided copy mode in response to an output of the sensor indicative of absence of an image on the back of the document.

BRIEF DESCRIPTION OF THE DRAWINGS

The above and other objects, features and advantages of the present invention will become more apparent from the following detailed description taken with the accompanying drawings in which:

FIGS. 6A and 6B are flowcharts demonstrating specific operations of a body controller and an RADF controller included in the control system of FIG. 3.

DESCRIPTION OF THE PREFERRED EMBODIMENT

Figure 1:
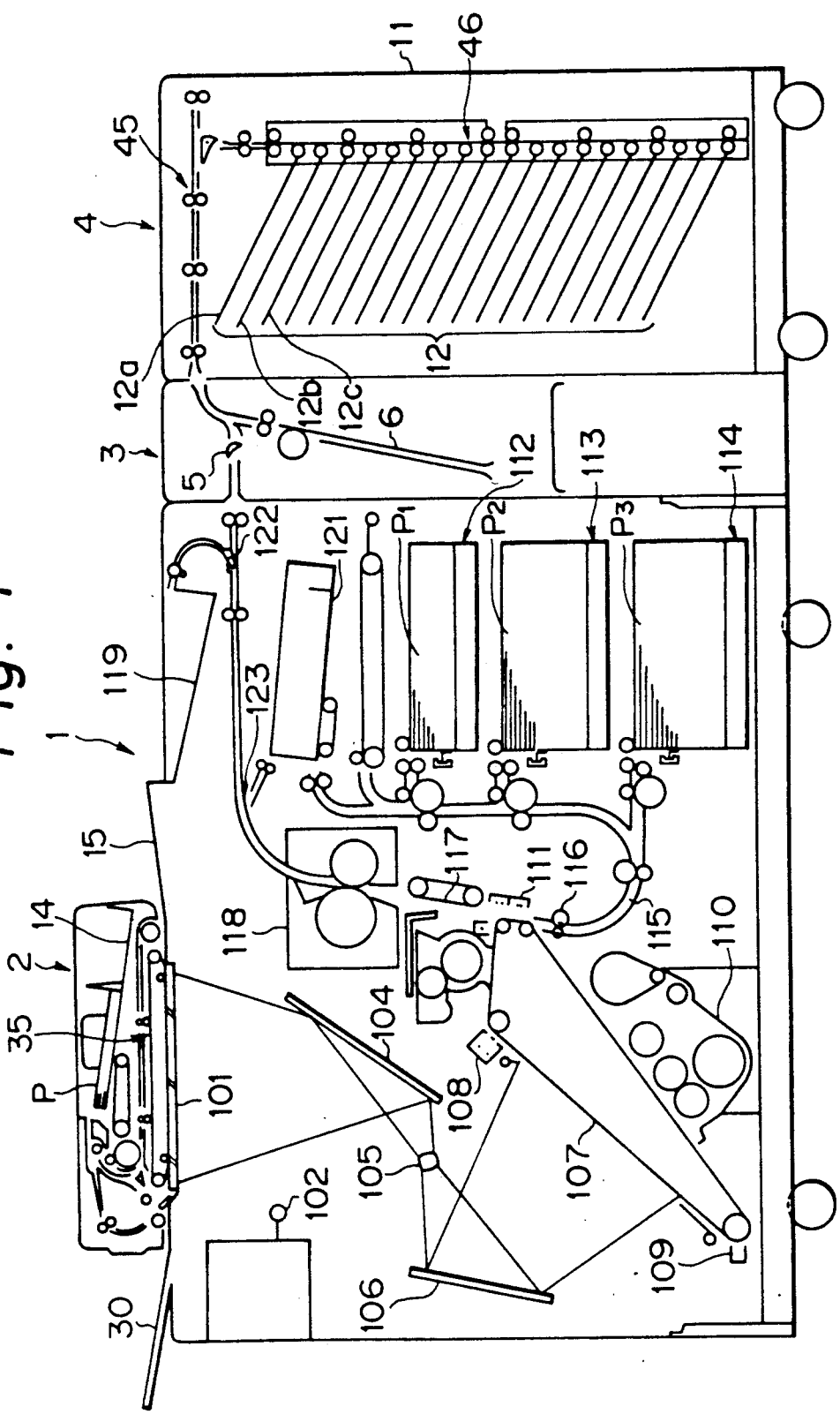
FIG. 1 is a section showing a copier embodying the present invention.

Referring to FIG. 1 of the drawings, a copier embodying the present invention is shown and has a copier body 1, a recyclic automatic document feeder (RADF) 2, a reversing device 3, and a sorter 4. The reversing device 3 reverses a paper sheet carrying an image thereon, as needed. The copier body 1 has an operation board, not shown, for entering desired copy modes, desired number of copies, image density, dimension of a binding margin, desired magnification change ratio, etc. When a copy start key provided on the operation board is pressed, the copier starts on a copying operation.

The RADF 2 has two document trays 14 and 15 for implementing two different document feed modes, i.e., an automatic document feed (ADF) mode and a semiautomatic document feed (SADF) mode. In the ADF mode, the RADF 2 automatically feeds a plurality of documents P stacked on the tray 14, one at a time. In the SADF mode, the RADF 2 automatically feeds documents which are laid on the tray 15 one by one by hand. The document fed from any one of the trays 14 and 15 is brought to a stop on a glass platen 101 provided on the copier body 1. As a flash lamp 102 illuminates the entire surface of the document, a reflection from the document is routed through a first mirror 104, a through lens 105 and a second mirror 106 to a photoconductive element 107 which is implemented as a belt. The belt 107 has been uniformly charged by a main charger 108 beforehand. As a result, a latent image associated with the document is electrostatically formed on the belt 107. After an eraser 109 has removed the charge from unnecessary portions of the belt 107, a developing unit 110 develops the toner image by a toner. The resulted toner image is transferred to a paper sheet by a transfer charger 111 at an image transfer station. The paper sheet is fed from any one of paper cassettes 112, 113 and 114 to a register roller 116 along a paper transport path. The register roller 116 drives the paper sheet toward the image transfer station in synchronism with the toner image formed on the belt 107. The paper sheet carrying the toner image thereon is transported to a fixing unit 118 by a transport belt 117 to fix the toner image. The paper sheet coming out of the fixing unit 118 is driven out of the copier body 1 to a copy tray 119 or driven straightforward to the reversing device 3 or steered by a selector pawl 123 toward an intermediate or two-side tray 121. When such paper sheets each carrying an image on one side thereof, i.e., one-sided paper sheets are stacked on the intermediate tray 121, they are refed face down one by one at predetermined timings to the image transfer station to form images on the other surface thereof.

On the other hand, the document undergone illumination is driven out from the glass platen 101 by a transporting device 35 having a belt. In a one-side copy mode, the document so driven out is discharged onto the tray 14 or a discharge tray 30. In a two-side copy mode, such a document is reversed by a reversing mechanism, which will be described, again set on the glass platen 101, illuminated at the other side thereof, and then driven out to the tray 14 or 30.

The reversing device 3 has a selector pawl 5 which is movable to steer a paper sheet into a switchback path 6, reverse it, and then drive it into the sorter 4 or to allow the paper sheet to advance straightforward, as needed. The sorter 4 has a housing 11 accommodating therein a horizontal transporting device 45, a vertical transporting device 46, and a number of bins 12 arranged one above another for stacking sorted paper sheets.

Figure 2:
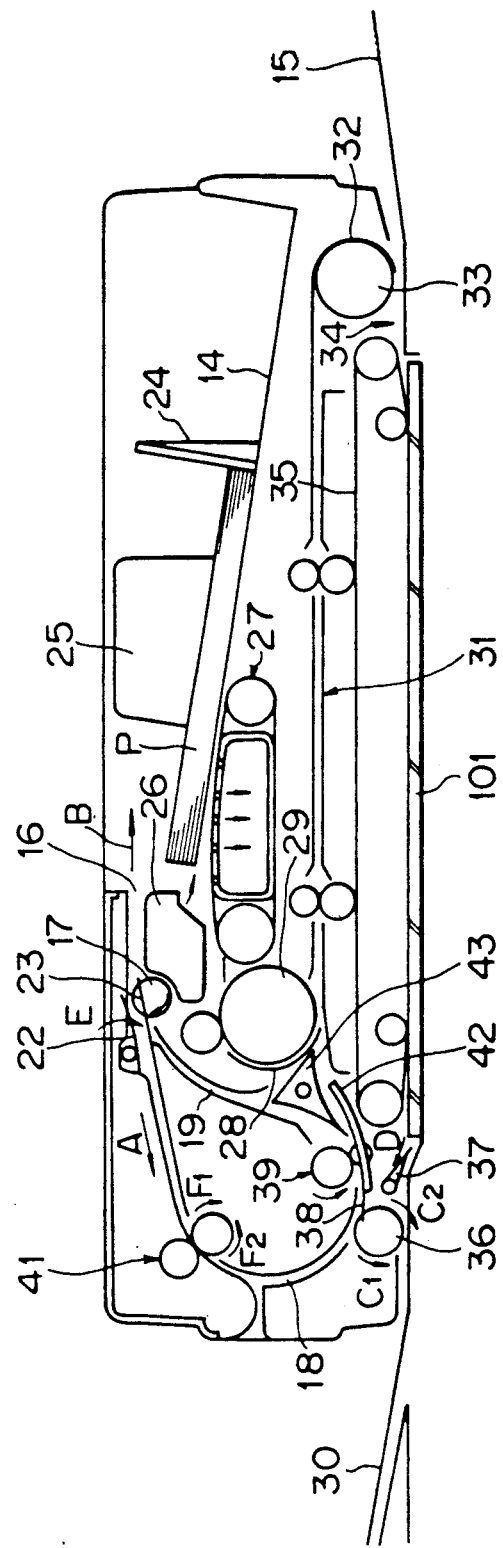
FIG. 2 is a section showing a recyclic automatic document feeder (RADF) of the illustrative embodiment in detail.

FIG. 2 shows the RADF 2 more specifically. The RADF 2 is selectively operable in a reverse mode and a non-reverse mode which are associated with the one-side coy mode and the two-side copy mode, respectively. In the reverse mode, when a document fed from the tray 14 and undergone illumination is to be driven out onto the tray 14 through an outlet 16, it is not directly discharged along a common path 18 in a direction indicated by an arrow B in FIG. 2. Instead, the document is once switched back in a direction A and thereby returned in a direction opposite to the discharging direction (arrow B) of a discharge roller 17, and then discharged in a reversed orientation along a reversal path 19. On the other hand, in the non-reverse mode, the document is discharged onto the tray 14 without being reversed. In both of the one-side and two-side copy modes, the document is driven along the common path 18. The reversal path 19 branches off the common path 18, as illustrated. A reversible inlet roller 36 is located at the point where the reversal path 19 branches off the common path 18, and it is selectively rotatable in a direction $C_1$ for driving the document into the common path 18 and a direction $C_2$ opposite to the direction C. A flat guide piece 38 is affixed to a reversal guide plate 42. The guide piece 38 is pressed against the inlet roller 36 when the document is transported in a direction D into the common path 18 or released from the roller 36 when the document is returned from the common path 18 in the other direction.

The RADF 2 further includes a movable presser member 22 which is rotatable in a direction indicated by an arrow E in FIG. 2. The presser member 22 releasably presses itself against the discharge roller 17 which is located in the vicinity of the outlet 16 and rotatable only in the direction indicated by an arrow in the figure. The presser member 22, therefore, selectively inhibits the document moving along the common path 18 from advancing in the discharging direction (arrow B). A stationary presser member 23 constantly presses the document moving along the reversal path 19 against the discharge roller 17. In a one-side copy mode, the movable presser member 22 inhibits the transport of the document in the discharging direction B along the common path 18 and, instead, causes it to be discharged via the reversal path 19 and outlet 16. An end plate 24 and a side plate 25 position the documents P stacked on the tray 14. A blower tank 26 blows out compressed air via nozzles as indicated by an arrow so as to lift the paper stack P. A transporting device 27 has a vacuum tank for sucking only the lowermost document onto a belt and thereby pulling out only one document at a time. Located downstream of the transporting device 27 are a first turn roller 29, a transverse path 31, a second turn roller 33, a reflection type (or transmission type) back-image sensor 34, a transporting device 35, and a selector pawl 37. The first turn roller 29 drives a document into a first turn path 28. The transverse path 31 has two pairs of rollers and transports a document to a second turn path 32. The second turn roller 33 is provided on the second turn path 32. The transporting device 35 has a belt a part of which contacts the glass platen 101. The selector pawl 37 is disposed at the inlet of the common path 18. A pull-out roller 39 and a selector pawl 43 are located at the point where the reversal path 19 branches off the common path 18. The selector pawl 43 steers a document switched back via the common path 18 into the transverse path 31. A reversible roller 41 is provided on the common path 18.

Assume that the RADF 2 is conditioned for the ADF mode, and that a stack of documents P are loaded on the tray 14 with their image surfaces facing downward if they are one-sided documents or with their front surface facing downward if they are two-sided document. When the copy start key is pressed, the lowermost document is separated from the others by the blower tank 26 and transporting device 27. The first turn roller 29 drives the separated document toward the transverse path 31 via the first turn path 28. Then, the second turn roller 33 and transporting device 35 transport the document to the glass platen 101 via the second turn path 32. On the other hand, assume that the SADF mode is selected and that a single document is laid on the tray 15. Then, on the operation of the print start key, the document is fed out by the second turn roller 33 and then driven by the transporting device 35 onto the glass platen 101. In any case, when the document passes the back-image sensor 34 located between the roller 33 and transporting device 35, a controller which will be described determines whether or not the document carries an image on the back thereof on the basis of the output of the sensor 34. This is to implement processing particular to the present invention as will be described.

When the document is set on the glass platen 101, one side (front) thereof is illuminated at a predetermined timing by the copier body 1. Thereafter, the document is driven out from the glass platen 101. The selector pawl 37 allows the document to directly reach the discharge tray 30 via the underside of the inlet roller 36 or to enter the common path 18 via the coactive guide member 38 and inlet roller 36, depending on the position thereof. Assuming that the document enters the common path 18 and that the one-side copy mode is selected, then the document is not directly discharged through the outlet 16. Specifically, as soon as the trailing edge of such a document moves away from the inlet roller 36, the roller 41 is reversed in a direction $F_2$ to switch back the document. As a result, the document is guided by the upper surfaces of the guide piece 38 and selector pawl 43 and, at the same time, pulled into the reversal path 19 by the roller 39 which is rotating as indicated by an arrow. Then, the stationary presser member 23 presses the document against the roller 17 with the result that the document is discharged onto the tray 14 with the image surface thereof inverted. At this instant, the movable presser member 22 is spaced apart and located above the roller 17 (position shown in FIG. 2) and, therefore, exerts hardly any transporting force on the document P being switched back in the direction A, in the direction B.

Assume that the document is driven into the common path 18, and that the two-side copy mode is selected. Then, when the trailing edge of the document moves away from the inlet roller 36, the selector pawl 43 is so positioned as to refeed the document to the transverse path 31 and, at the same time, the roller 41 is reversed in the direction $F_2$ to switch back the document. In this condition, the document is transported through between the guide piece 38 and the underside of the selector pawl 43 while being guided by the upper surface of the guide piece 38. The pull-out roller 39 and first turn roller 29 again drive such a document into the transverse path 31. Then, the second turn roller 33 and transporting device 35 transport the document to the glass platen 101 via the second turn path 32. At this time, the document is set on the glass platen 101 with the back thereof facing downward. After the back of the document has been illuminated, the document is discharged onto the tray 30 or driven into the common path 18, depending on the position of the selector pawl 37. When the document is driven into the common path 18, the roller 41 rotating in the direction $F_1$ further drives it toward the roller 17 which is rotating in the same direction as the roller 41. The movable presser member 22 presses the document against the roller 17, and the roller 16 discharges it onto the tray 14.

Figure 3:
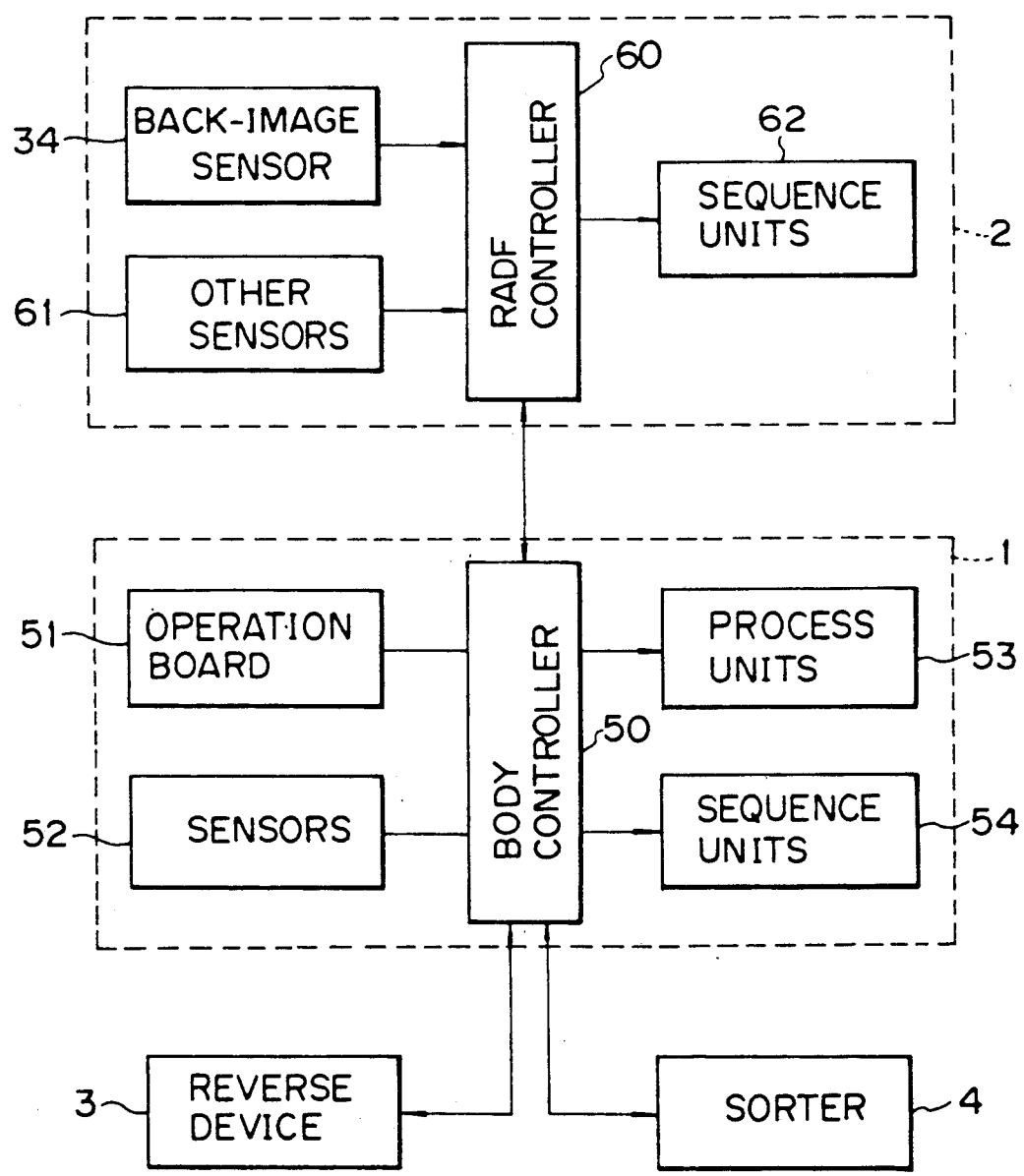
FIG. 3 is a block diagram schematically showing a control system of the embodiment.

Referring to FIG. 3, a control system associated with the illustrative embodiment is shown. As shown, the copier body 1 has a body controller 50 which includes a microcomputer having a CPU, ROM, RAM, I/O interface, etc. The body controller 50 receives various informations from an operation board 51, an RADF controller 60, the reversing device 3 and the sorter 4 as well as output signals of sensors 52. In response, the body controller 50 controls various process units 53 including the flash lamp 102, main charger 108, eraser 109, developing unit 110, transfer charger 111 and fixing unit 118, FIG. 1, sequence units 54 including motors, solenoids and fixing heater, while delivering various information to the RADF controller 60, reversing device 3, and sorter 4. The RADF controller 60, like the body controller 50, has a microcomputer. While receiving information from the body controller 50 and output signals of sensors 61 including the back-image sensor 34, the RADF controller 60 controls sequence units 62 including motors and solenoids while sending information to the body controller 50.

Figure 4:
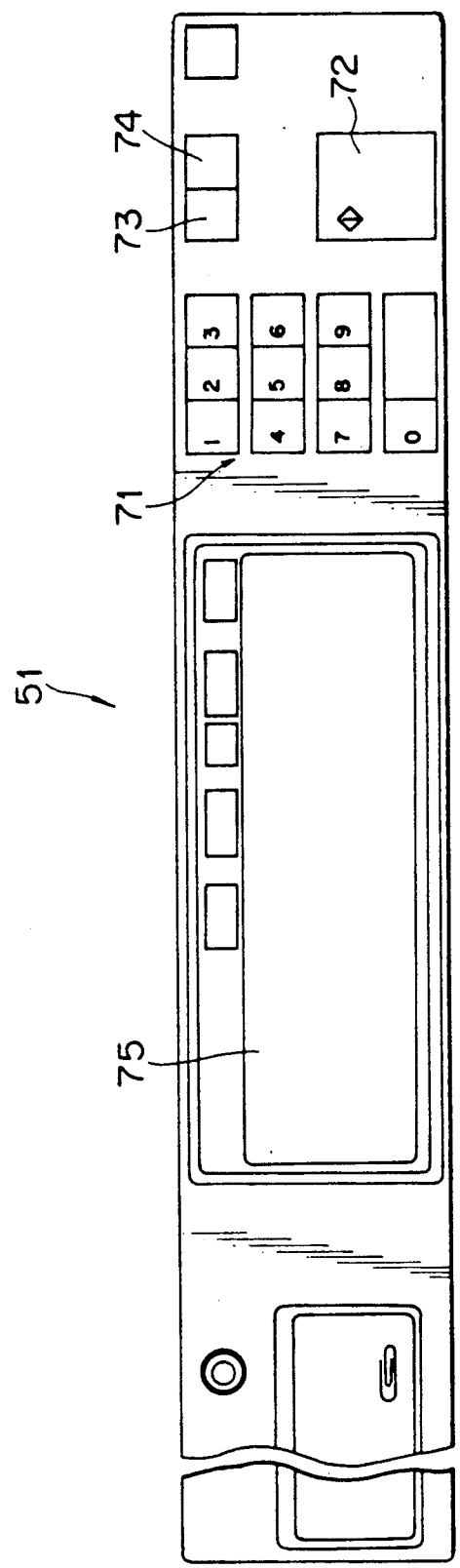
FIG. 4 is a plan view showing a specific layout of an operation board included in the embodiment.
Figure 5:
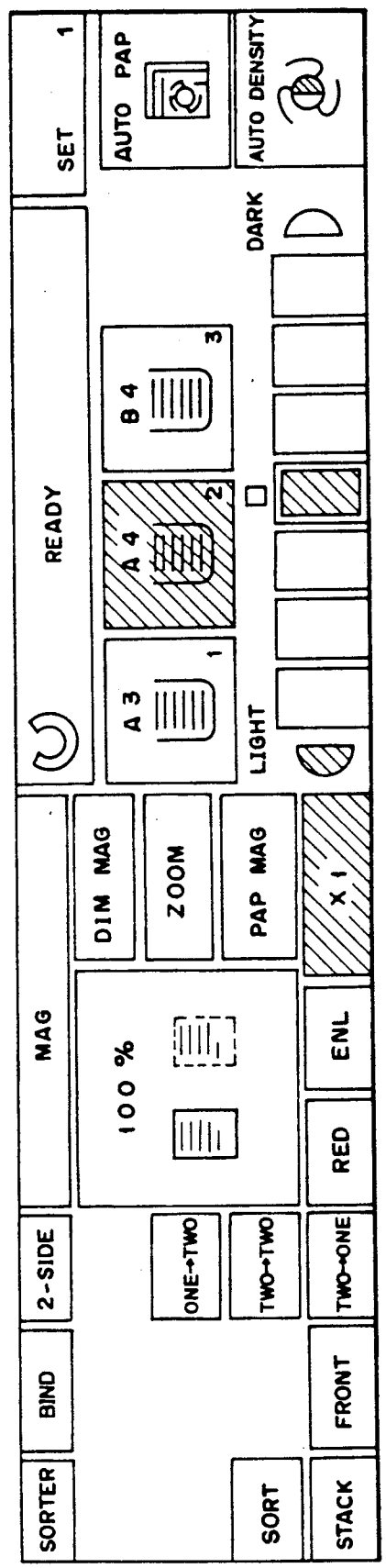
FIG. 5 is a view similar to FIG. 4, showing a specific picture appearing on a liquid crystal display provided on the operation board of FIG. 4.

FIG. 4 shows a specific layout of the operation board 51. As shown, the operation board 51 has numeral keys 71, a copy start key 71, an enter key 73, an interrupt key 74 and other various keys, a liquid crystal display (LCD) 75, etc. The LCD 75 has a touch panel having a number of touch sensors built in the display area thereof (e.g. on an 8×8 pixel basis). FIG. 5 shows a specific picture which appears on the LCD 75 on the turn-on of the power source for allowing the operator to enter desired copy modes. For example, the operator may select an ADF mode, two-side copy mode and sort mode by touching corresponding portions of such a picture on the LCD 75.

The illustrative embodiment is selectively operable in various extra modes in addition to the ordinary one-side and two-side copy modes having been described, as commanded on the picture shown in FIG. 5. The extra modes are a one-sided document/two-sided copy mode (ONE→TWO) for reproducing images printed on the front surfaces of two documents on both sides of a single paper sheet, a two-sided document/two-sided copy mode (TWO→TWO) for reproducing images printed on both sides of a document on both sides of a single paper sheet, and a two-sided document/one-sided copy mode (TWO-ONE) for reproducing images printed on both sides of a document on one side of two paper sheets.

Figure 6B:
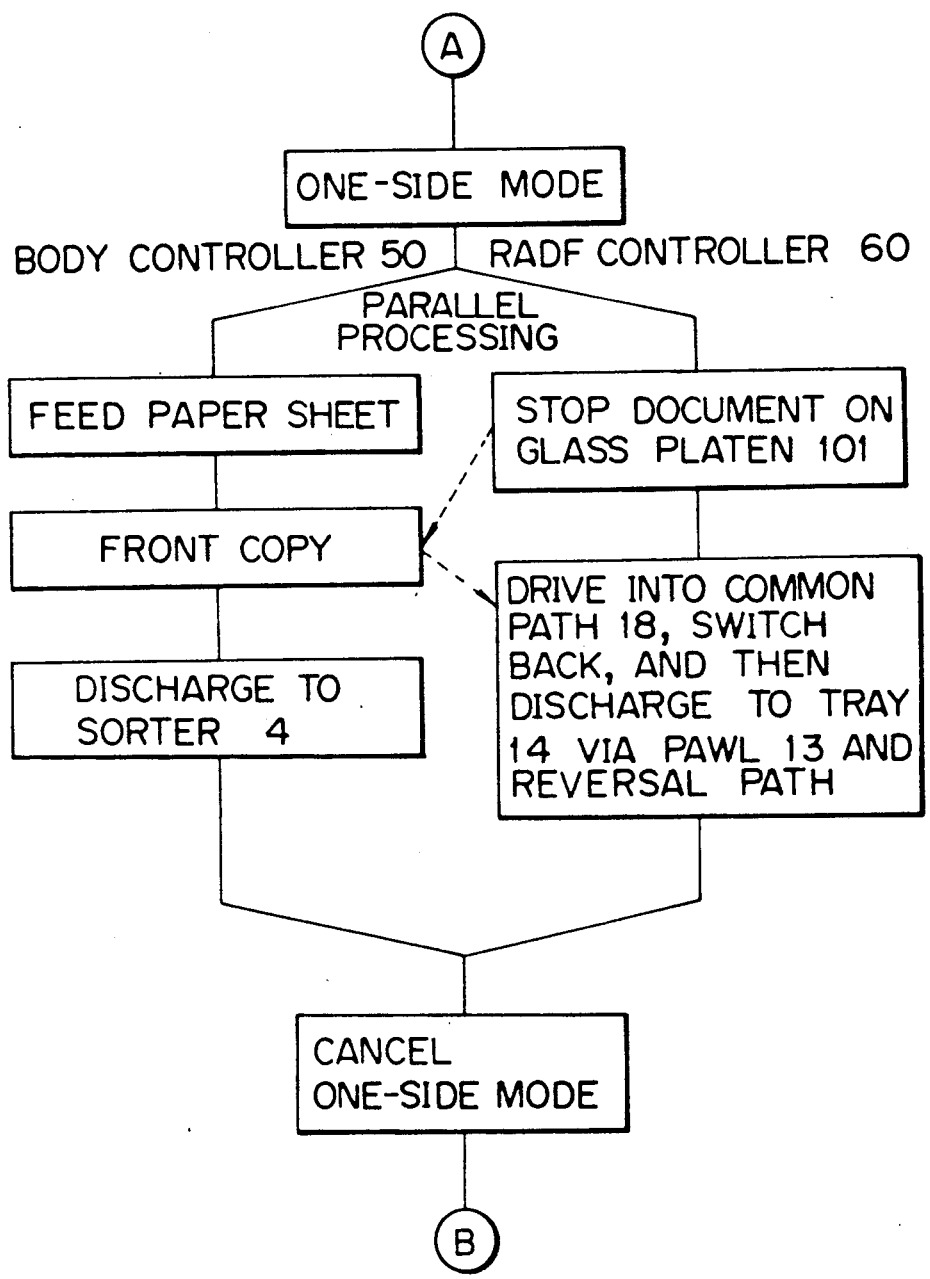

The operation of the illustrative embodiment will be described with reference also made to FIGS. 6A to 6B. Specifically, FIGS. 6A and 6B demonstrate specific operations of the body controller 50 and RADF controller 60 and show them in parallel for simplicity. The procedure shown in the figures begins when the copy start key 72, FIG. 4, is pressed after a plurality of documents P have been set on the tray 14. First, the RADF controller 60 drives the sequence units 62 to feed the lowermost document. While the so fed document is passing the back-image sensor 34, the RADF controller 60 checks the output of the sensor 34 to see if the document carries an image on the back thereof. If an image is present on the back of the document, both the RADF controller 60 and the body controller 60 which is instructed by the controller 60 enter into a two-sided mode. At this instant, the controllers 50 and 60 start on their parallel processing matching the two-side mode. Specifically, the body controller 50 drives the sequence units 54 to feed a paper sheet from a selected tray while the RADF controller 60 brings the document to a stop on the glass platen 101.

As soon as the document is set on the glass platen 101, the RADF controller 60 instructs the body controller 50 to cause the various process units 53 into the previously stated copying operation for reproducing an image on the front (underside) of a paper sheet. A paper sheet carrying an image on the front thereof is stacked on the intermediate tray 121 and then refed toward the image transfer station at a predetermined timing. On the other hand, after the front of the document laid on the glass platen 101 has been illuminated, the body controller 50 instructs the RADF controller 60 to transport the document into the common path 18, switch it back, and then feed it again into the transverse path 31 via the underside of the selector pawl 43. As a result, the document is reversed and brought to a stop on the glass platen 101 with its back facing downward. Then, the RADF controller 60 instructs the body controller 50 to cause the process units 53 to reproduce an image printed on the back of the document on the other side of the paper sheet which is refed from the intermediate tray 121. The reversing device 3 actuates the selector pawl 5 to drive the resulted two-sided paper sheet or copy into the switchback path 6 and then delivers it into the sorter 4. After the front of the document has been illuminated, the RADF controller 60 discharges the document onto the tray 14 via the common path 18 in response to an instruction from the body controller 50.

Thereupon, the body controller 50 and RADF controller 60 cancel the two-side mode. The RADF controller 60 determines whether or not the number of copies produced in coincident with the desired number of copies and, if the answer is positive, ends the processing. If the answer is negative, the RADF controller 60 returns to the document feeding step to repeat the above-described procedure.

Assume that an image is absent on the back of the document. Then, the RADF controller 60 and body controller 50 both enter into a one-side mode. At this instant, the controllers 50 and 60 start one their parallel processing matching the one-side mode. Specifically, the body controller 50 drives the sequence units 54 to feed a paper sheet from a selected paper tray, while the RADF controller 60 brings the document to a stop on the glass platen 101. Thereupon, the RADF controller 60 sends an instruction to the body controller 50 for reproducing an image on one side of the paper sheet. The one-sided paper sheet is routed through the reversing device 3 to the sorter 4. After the front of the document has been illuminated, the body controller 50 instructs the RADF controller 60 to transport the document into the common path 18, switch it back, and then discharge it onto the tray 14 via the upper surface of the selector pawl 43 and reversal path 19. Thereafter, the controllers 50 and 60 cancel the one-side mode. The RADF controller 60 determines whether or not the number of copies produced is coincident with the desired number of copies and, if the answer is positive, ends the processing. If the answer is negative, the RADF controller 60 returns to the document feeding step to repeat the above-described procedure.

Regarding the sorter 4 shown in FIG. 1, assume that "1" is set on the numeral keys 71, FIG. 4, as a desired number of copies. Then, the sorter 4 distributes the paper sheet or copy coming out of the copier body 1 via the reversing device 3 into the uppermost bin 12a face down. As the desired number of copies increases to "2", "3" and so on, the sorter 4 distributes the second and successive copies into the bins 12b, 12c and so on face down.

The illustrative embodiment is operable even with a combined stack of one-sided and two-sided documents loaded on the tray 14 of the RADF 2. Specifically, the two-side mode is set up if a document is two-sided as determined by the back-image sensor 34, or the one-side mode is set up if otherwise. Further, in the two-side mode, the paper sheets or copies are discharged after being reversed. This is successful in saving the time and labor for dividing documents into one-sided documents and two-sided documents and, since the copies are discharged in order of page, in making it needless to rearrange them.

In the embodiment shown and described, it is only in the two-side copy mode that copies are reversed by the reversing device 3 and distributed to the bins of the sorter 4 face down, so that it is not necessary for the copies to be rearranged. Alternatively, the reversing device 3 may operate only in the one-side mode to distribute copies to the sorter 4 face up. Then, the copies will be readily rearranged in order of page since the page number sequentially decreases from the top to the bottom.

When use is made of a mechanism of the type discharging copies face up without reversing them, an arrangement may be so made as to reverse copies only in the one-side mode. Then, the copies will be successively discharged in order of page.

The foregoing description has concentrated on documents stacked on the tray 14 which is assigned to the ADF mode. Even when documents are laid one by one by hand on the tray 15 adapted for the SADF mode, the copy mode may be changed over on the basis of the output of the back-image sensor 34. This makes it needless for the operator to select either the one-side mode or the two-side mode beforehand, thereby eliminating the entry of undesired modes.

In summary, it will be seen that the present invention provides a copier wherein, even when a tray of an ADF is loaded with a combined stack of one-sided and two-sided documents, the documents are automatically reproduced on both sides of paper sheets if they are two-sided or on one side of the paper sheets if they are one-sided. The resultant copies are accurately arranged in order of page. This saves the time and labor for sorting documents beforehand and rearranging copies in order of page and, yet, does not increase the copying time.

Various modifications will become possible for those skilled in the art after receiving the teachings of the present disclosure without departing from the scope thereof.

What is claimed is:

1. A copier having an automatic document feeder (ADF) and selectively operable in a one-side copy mode for reproducing a document image on only one side of a paper sheet and a two-sided copy mode for reproducing document images on both sides of a paper sheet, said copier incorporating a reversing device for reversing a paper sheet undergone a copying procedure, said copier comprising:

sensing means for determining whether or not a document being transported by said ADF toward an illuminating position carries an image on the back thereof; and control means for automatically conditioning said copier for the two-sided copy mode in response to an output of said sensing means indicative of presence of an image on the back of said document or for the one-sided copy mode in response to an output of said sensing means indicative of absence of an image on the back of said document.

2. A copier as claimed in claim 1, wherein said control means controls said reversing device such that said reversing device reverses, only in one of the two-sided copy mode and one-sided copy mode, a paper sheet undergone a copying procedure before said paper sheet is discharged.

3. A copier as claimed in claim 1, wherein said control means comprises a microcomputer.

* * * * *